(12) United States Patent
Dickey et al.

(10) Patent No.: US 9,593,954 B2
(45) Date of Patent: Mar. 14, 2017

(54) NAVIGATION SYSTEM WITH CONTENT DELIVERY MECHANISM AND METHOD OF OPERATION THEREOF

(71) Applicant: Telenav, Inc., Sunnyvale, CA (US)

(72) Inventors: Lucas Dickey, Los Angeles, CA (US); Eli Portnoy, Los Angeles, CA (US); John Hinnegan, Santa Monica, CA (US)

(73) Assignee: Telenav, Inc., Santa Clara, CA (US)

(*) Notice: Subject to any disclaimer, the term of this patent is extended or adjusted under 35 U.S.C. 154(b) by 0 days.

(21) Appl. No.: 14/472,177

(22) Filed: Aug. 28, 2014

(65) Prior Publication Data

US 2016/0061609 A1    Mar. 3, 2016

(51) Int. Cl.
G01C 21/26    (2006.01)
G01C 21/36    (2006.01)
G06Q 30/02    (2012.01)

(52) U.S. Cl.
CPC ......... *G01C 21/26* (2013.01); *G01C 21/3679* (2013.01); *G01C 21/3697* (2013.01); *G06Q 30/02* (2013.01)

(58) Field of Classification Search
CPC ....... H04N 21/25891; H04N 21/44222; H04N 21/4758; G01C 21/26; G01C 21/3679; G01C 21/3697; G06Q 30/02
See application file for complete search history.

(56) References Cited

U.S. PATENT DOCUMENTS

| | | | |
|---|---|---|---|
| 8,471,701 B2 | 6/2013 | Yariv et al. | |
| 2013/0178233 A1 | 7/2013 | McCoy et al. | |
| 2014/0089956 A1* | 3/2014 | Shah et al. | 725/14 |
| 2014/0213300 A1* | 7/2014 | Spears | H04W 4/022 455/456.3 |

\* cited by examiner

*Primary Examiner* — Basil T Jos
(74) *Attorney, Agent, or Firm* — IP Investment Law Group (57) ABSTRACT

A method of operation of a navigation system includes: determining a target value level based on an activity history for responding to a notification; determining a boundary dimension with a control unit based on the target value level; and generating a geofence including the boundary dimension for adjusting the boundary size for displaying on a device.

20 Claims, 6 Drawing Sheets

NAVIGATION SYSTEM WITH CONTENT DELIVERY MECHANISM AND METHOD OF OPERATION THEREOF

TECHNICAL FIELD

The present invention relates generally to a navigation system, and more particularly to a system with content delivery mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without content delivery mechanism to efficiently deliver content to user has become a paramount concern for the consumer. The inability decreases the benefit of using the tool.

Thus, a need still remains for a navigation system with content delivery mechanism to deliver content efficiently to the user. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a target value level based on an activity history for responding to a notification; determining a boundary dimension with a control unit based on the target value level; and generating a geofence including the boundary dimension for adjusting the boundary size for displaying on a device.

The present invention provides a navigation system, including: a control unit for: determining a target value level based on an activity history for responding to a notification, determining a boundary dimension based on the target value level, generating a geofence including the boundary dimension for adjusting the boundary size, and a communication interface, coupled to the control unit, for communicating the geofence for displaying on a device.

The present invention provides a navigation system having a non-transitory computer readable medium including instructions for execution, the instructions comprising: determining a target value level based on an activity history for responding to a notification; determining a boundary dimension based on the target value level; and generating a geofence including the boundary dimension for adjusting the boundary size for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
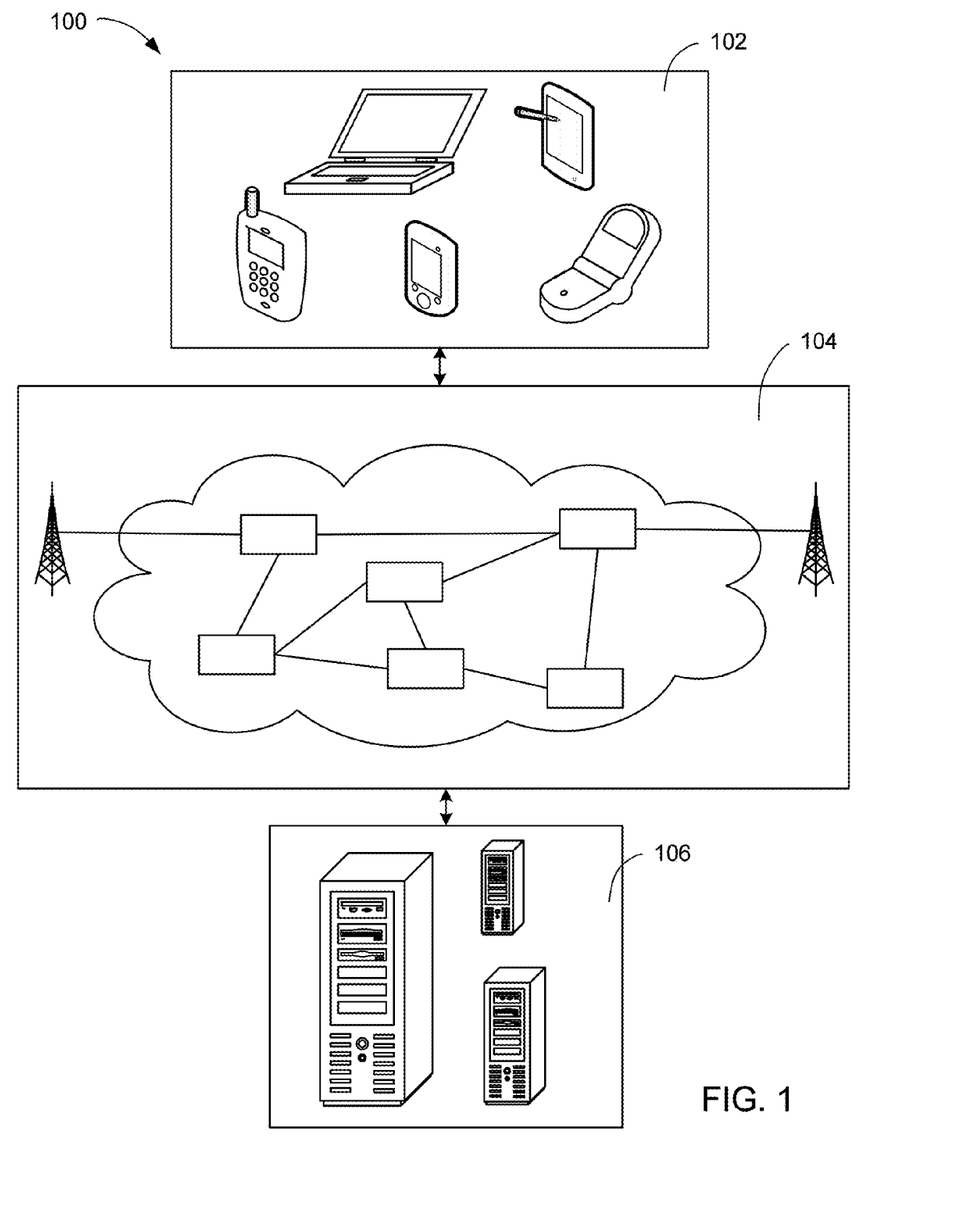
FIG. 1 is a navigation system with content delivery mechanism in an embodiment of the present invention.

Referring now to FIG. 1, therein is shown a navigation system 100 with content delivery mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
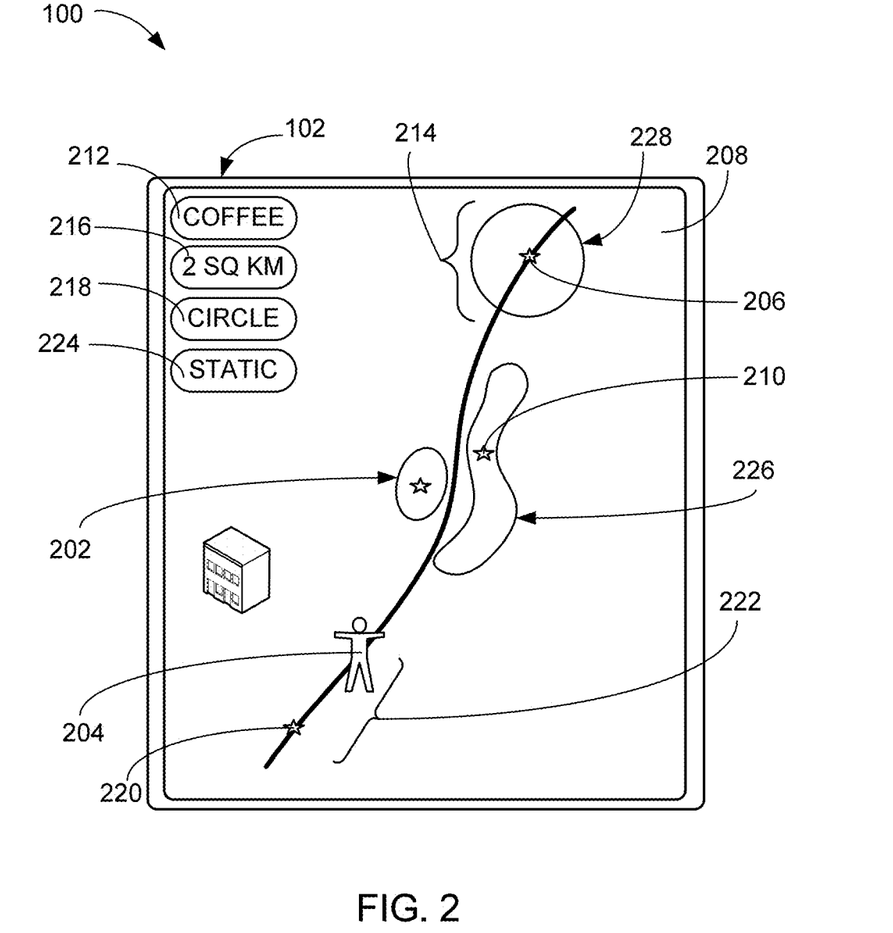
FIG. 2 is an example of a geofence.

Referring now to FIG. 2, there is shown an example of a geofence 202. For clarity and brevity, the discussion of the embodiment of the present invention will focus on the first device 102 delivering the result generated by the navigation system 100. However, various embodiments of the present invention can easily be applied with the description with the second device 106 of FIG. 1 and the first device 102 interchangeably.

The geofence 202 is defined as a boundary established to trigger an action. For example, the geofence 202 can surround a user location 204, a point of interest 206, or a combination thereof. For another example, a plurality of the geofence 202 can be placed adjacent to one another, randomly from one another, or a combination thereof in a geographic region 208.

The geographic region 208 can represent a physical area traversed by the user of the navigation system 100. A placement location 210 is defined as the physical location where the geofence 202 is placed. For example, the placement location 210 can be within the geographic region 208.

The user location 204 is defined as a physical location of the first device 102. For example, the user location 204 can represent the past location, the current location, or the future location presented by the first device 102. The point of interest 206 can represent a target destination for the user's travel. For another example, the point of interest 206 can represent a physical location interested by the user to visit for a location category 212. The location category 212 is defined as a classification of the point of interest 206.

The geofence 202 can include a geofence type 224, such as a dynamic geofence 226, a static geofence 228, or a combination thereof. The geofence type 224 is defined as a classification of the geofence 202. The dynamic geofence 226 is defined as the geofence 202 including a boundary dimension 214 that can be changed. The static geofence 228 is defined as the geofence 202 including the boundary dimension 214 that cannot be changed.

The boundary dimension 214 is defined as a spatial property of the geofence 202. For example, the boundary dimension 214 can include length, width, altitude, radius, diameter, circumference, area, or a combination thereof. For further example, the boundary dimension 214 can include a boundary size 216, a boundary shape 218, or a combination thereof.

The boundary size 216 is defined as a magnitude of the boundary dimension 214. For example, the boundary size 216 can represent how large or how small the area of the geofence 202. The boundary shape 218 can represent an outline, a contour, or a combination thereof of the boundary dimension 214. For example, the boundary shape 218 can include the geofence 202 in a shape of a circle, a polygon, an amorphous shape, or a combination thereof.

A travel origin 220 is defined as the starting location of the user's travel. A travel distance 222 is defined as a physical distance traveled to reach a location. For example, the travel distance 222 can be from the travel origin 220, the user location 204, or a combination thereof to reach the point of interest 206.

Figure 3:
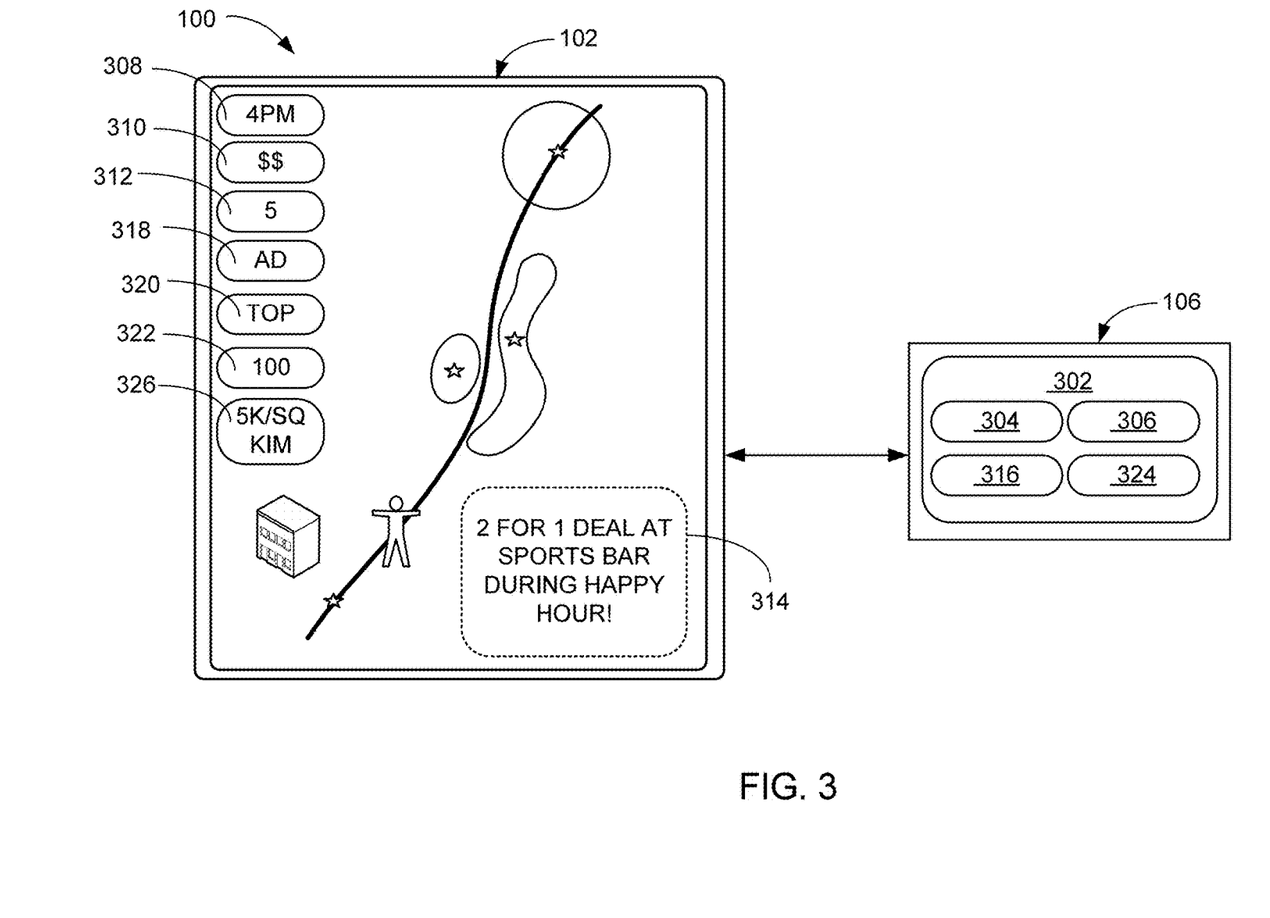
FIG. 3 is further examples of a geofence factor.

Referring now to FIG. 3, there is shown an example of a geofence factor 302. The geofence factor 302 can be communicated between the first device 102 and the second device 106. The geofence factor 302 is defined as an element contributing to generating the geofence 202 of FIG. 2. For example, the geofence factor 302 can include an activity history 304, a target value level 306, a timeframe 308, a price level 310, or a combination thereof.

The activity history 304 is defined as a log of user's activity for engaging with the navigation system 100. For example, the activity history 304 can keep track of a selection count 312, which is defined as the number of time the user selected a notification 314 within the geofence 202. A selection threshold 316 is defined as a minimum number of the selection count 312.

The notification 314 is defined as information presented by the navigation system 100. For example, the notification 314 can include a notification type 318, such as an advertisement, a coupon, an alert, or a combination thereof. The notification type 318 is defined as a classification of the notification 314. For example, the notification type 318 can include an audio version, a visual version, or a combination thereof of the notification 314.

The target value level 306 is defined as an importance level. For example, the target value level 306 can represent how important the user is to the advertiser of the notification 314. For further example, the target value level 306 can be represented in alphanumeric value ranging from 0 to 10, A to F, or a combination thereof with 10 or A representing the highest level.

A boundary priority 320 is defined as a superiority level given to one instance of the geofence 202 over another instance of the geofence 202. For example, the geofence 202 including the most number of a valuable target number 322 of the users with the highest instance of the target value level 306 may be assigned the highest instance of the boundary priority 320.

The valuable target number 322 is defined as a count for a number of people having the target value level 306. For example, the valuable target number 322 can represent the number of people with the lowest instance of the target value level 306. A target threshold 324 is defined as a minimum number of instances for the valuable target number 322.

A price level 310 can represent a cost of service, product, or a combination thereof offered at the point of interest 206 of FIG. 2. A timeframe 308 is defined as time period. For example, the timeframe 308 can include a time of day, week, month, year, season, or a combination thereof. A region density 326 is defined as a density of population within the geographic region 208 of FIG. 2.

Figure 4:
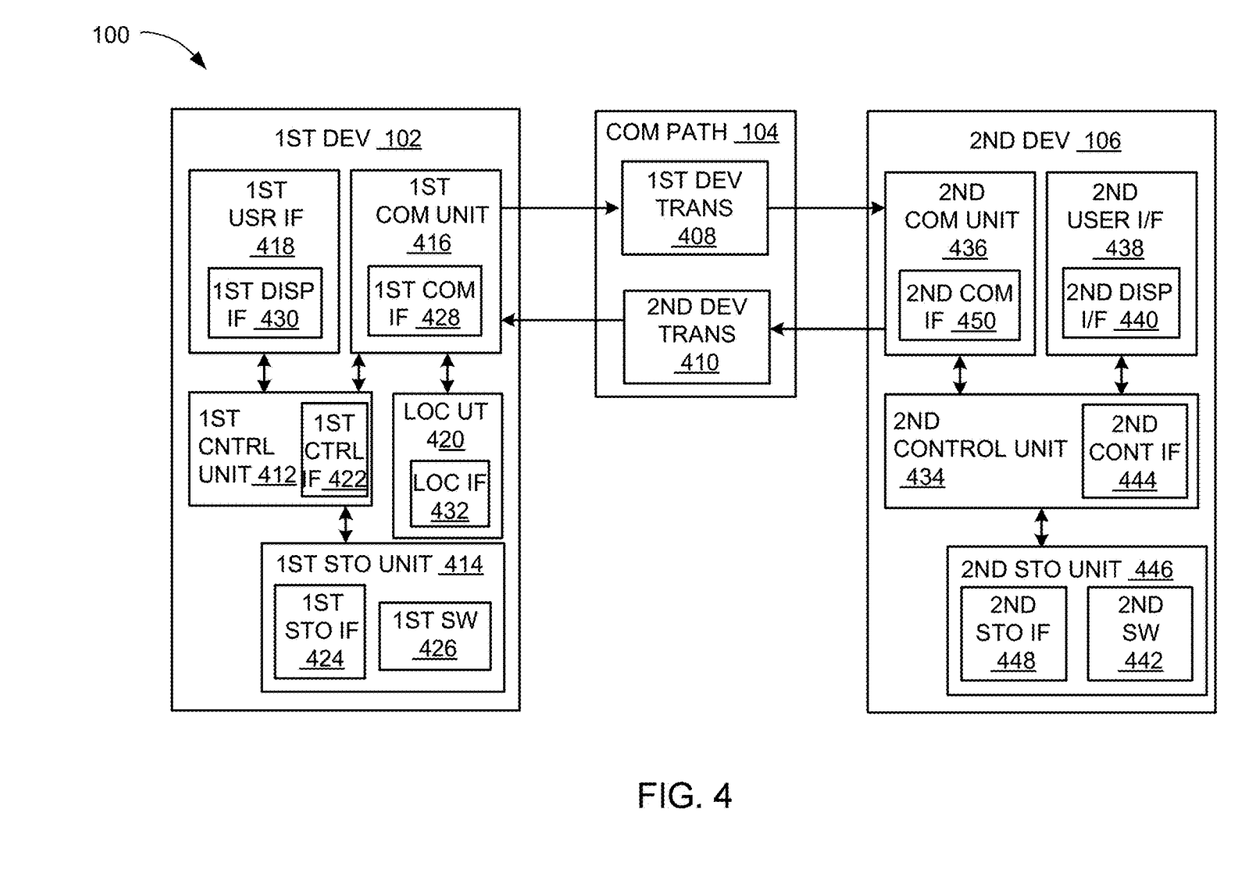
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units.

The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
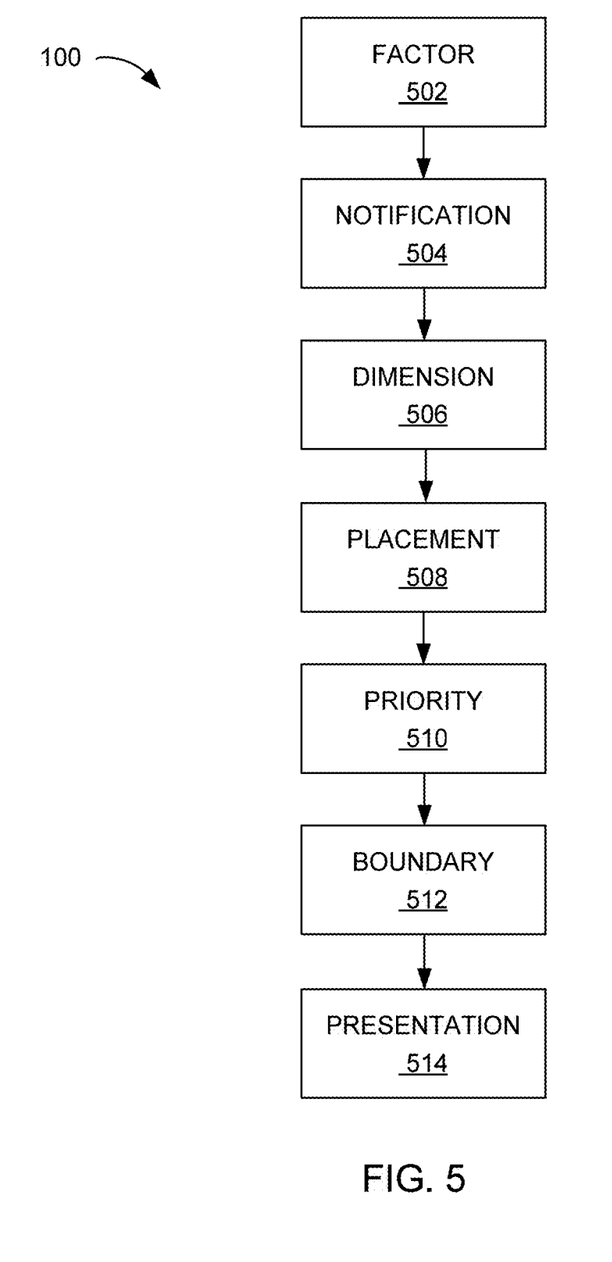
FIG. 5 is a control flow of the navigation system.

Referring now to FIG. 5, therein is shown a control flow of the navigation system 100. The navigation system 100 can include a factor module 502. The factor module 502 manages the geofence factor 302 of FIG. 3. For example, the factor module 502 can receive the geofence factor 302 from an external source via the first control interface 422 of FIG. 4.

The factor module 502 can manage the geofence factor 302 in a number of ways. For example, the factor module 502 can determine the user location 204 of FIG. 2 based on the location unit 420 of FIG. 4 locating the physical location of the first device 102 within the geographic region 208 of FIG. 2. For further example, the factor module 502 can receive the region density 326 of FIG. 3 of the geographic region 208 for the point of interest 206 of FIG. 2, the location category 212 of FIG. 2, or a combination thereof from an external source, such as the World Bank, via the first control interface 422.

The factor module 502 can determine the travel origin 220 of FIG. 2, the travel distance 222 of FIG. 2, or a combination thereof based on the activity history 304 of FIG. 3. More specifically, the factor module 502 can determine the travel origin 220 to represent Santa Monica, California based on the activity history 304 tracking the user location 204 of the first device 102. Moreover, the factor module 502 can determine the travel distance 222 traveled by the first device 102, for example, from the user location 204 to the point of interest 206 logged in the activity history.

For a different example, the factor module 502 can determine the target value level 306 of FIG. 3 based on the activity history 304 of the notification 314 of FIG. 3 selected on the first device 102. More specifically, the activity history 304 can include the notification type 318 of FIG. 3 selected at the specific instance of the timeframe 308 of FIG. 3, the point of interest 206, the geographic region 208, the price level 310 of FIG. 3, the geofence 202 of FIG. 2, or a combination thereof.

The factor module 502 can determine the target value level 306 of the user based on whether the selection count 312 of FIG. 3 meets or exceeds the selection threshold 316 of FIG. 3. More specifically, if the selection count 312 meets or exceeds the selection threshold 316, the factor module 502 can determine the target value level 306 to represent "valuable." In contrast, if the selection count 312 is below the selection threshold 316, the factor module 502 can determine the target value level 306 to represent "not valuable."

For further example, the factor module 502 can set different instances of the selection threshold 316 for different levels of the target value level 306. More specifically, the target value level 306 can range from 1 to 10 with 10 being the highest instance. For the highest instance of the target value level 306, the selection threshold 316 can be set to 5 per day. If the selection count 312 meets or exceeds 5 selections per day of the notification 314, the factor module 502 can determine that the user represents the highest instance of the target value level 306. The factor module 502 can communicate the geofence factor 302 to a notification module 504.

The navigation system 100 can include the notification module 504, which can couple to the factor module 502. The notification module 504 generates the notification 314. For example, the notification module 504 can generate the notification 314 based on the geofence factor 302.

The notification module 504 can generate the notification 314 in a number of ways. For example, the notification module 504 can generate the notification 314 based on the geographic region 208. More specifically, the geographic region 208 can represent Texas. The notification module 504 can generate the notification 314 representing an advertisement for barbeque because Texas is known for the barbeque cuisine.

For a different example, the notification module 504 can generate the notification 314 based on the timeframe 308. More specifically, the timeframe 308 can represent summer. The notification module 504 can generate the notification 314 advertising ice cream for the summer time.

For another example, the notification module 504 can generate the notification 314 based on the location category 212. More specifically, the location category 212 can represent coffee shop. The notification module 504 can generate the notification 314 representing a coupon for two for one drink.

The notification module 504 can update the notification type 318 based on the geofence factor 302. For example, the notification 314 can represent a coupon. The notification module 504 can update the notification type 318 by changing the value presented on the notification 314. More specifically, the notification module 504 can update the notification type 318 for instances of the point of interest 206 in different instances of the geographic region 208.

For example, the notification module 504 can update the notification type 318 by increasing the value of the coupon to compensate for the higher living cost for the geographic region 208 representing New York City. In contrast, the notification module 504 can update the notification type 318 by decreasing the value of the coupon to accommodate the lower living cost if the geographic region 208 represented Oklahoma City.

For another example, the notification module 504 can update the notification type 318 by increasing the value of the coupon for the user with the highest instance of the target value level 306 to reward the user with a premium status. In contrast, the notification module 504 can update the notification type 318 by decreasing the value of the coupon for the user with the activity history 304 showing no purchase of item at the point of interest 206 in the given instance of the timeframe 308. The notification module 504 can communicate the notification 314 including the notification type 318 to a dimension module 506.

The navigation system 100 can include the dimension module 506, which can couple to the notification module 504. The dimension module 506 determines the boundary dimension 214 of FIG. 2. For example, the dimension module 506 can determine the boundary dimension 214 including the boundary size 216 of FIG. 2, the boundary shape 218 of FIG. 2, or a combination thereof for the geofence 202.

The dimension module 506 can determine the boundary dimension 214 in a number of ways. For example, the dimension module 506 can determine the boundary dimension 214 based on the geofence factor 302. More specifically, the geofence factor 302 can represent the timeframe 308. The dimension module 506 can determine the boundary dimension 214 having the boundary shape 218 of egg shape when the timeframe 308 is in the morning for a particular instance of the point of interest 206. In contrast, the dimension module 506 can determine the boundary shape 218 of rectangle when the timeframe 308 is in the afternoon for the same instance of the point of interest 206.

For further example, the timeframe 308 of morning can attract more coffee drinkers to the location category 212 of coffee shop than the timeframe 308 of afternoon. The dimension module 506 can determine the boundary size 216 for the boundary dimension 214 for the point of interest 206 with the location category 212 of coffee shop to be bigger in the morning than the boundary size 216 in the afternoon.

For further example, the dimension module 506 can update the boundary size 216, the boundary shape 218, or a combination thereof granularly based on the timeframe 308. More specifically, the dimension module 506 can update the boundary size 216 by changing the boundary size 216, the boundary shape 218, or a combination thereof from the timeframe 308 of 8 am to the timeframe 308 of 12 pm hourly.

It has been discovered that the navigation system 100 determining the boundary dimension 214 based on the timeframe 308 improves the efficiency of delivering the notification 314. By updating the boundary size 216 based on the timeframe 308, the navigation system 100 can allocate resources optimally by reducing waste of impression for delivering the notification 314. As a result, the navigation system 100 can maximize the impression of the notification 314 delivered to the first device 102 for improving the operation of the first device 102, the navigation system 100, or a combination thereof.

For a different example, the dimension module 506 can determine the boundary dimension 214 based on the region density 326. More specifically, the region density 326 of New York City can be greater than the region density 326 of Oklahoma City. As a result, the dimension module 506 can determine the boundary size 216 of the boundary dimension 214 for Oklahoma City to be larger than the boundary size 216 for New York City to be able to deliver the notification 314 for a greater number of people where the population density is low.

For another example, the dimension module 506 can determine the boundary dimension 214 based on the travel origin 220, the point of interest 206, or a combination thereof. As indicated above, the activity history 304 can log the travel origin 220, the point of interest 206, or a combination thereof by having the user location 204 tracked. The dimension module 506 can determine the boundary dimension 214 based on the travel origin 220 where the user or users had traveled from to reach the point of interest 206.

For example, the point of interest 206 can represent a farmer's market for the travel origin 220 for one user coming from a high income suburban area. For another example, the point of interest 206 can represent a shopping mall for the travel origin 220 for another user coming from a low income area. The dimension module 506 can determine the boundary size 216 for the geofence 202 surrounding the farmers market to be larger than the boundary size 216 for the geofence 202 surrounding the shopping mall to maximize the potential of the user responding to the notification 314.

For a different example, the dimension module 506 can determine the boundary dimension 214 based on the target value level 306. More specifically, a higher instance of the target value level 306 is assigned based on the response rate of the user to the notification 314. As a result, the dimension module 506 can determine the boundary size 216 for the geofence 202 surrounding the point of interest 206 frequented by the user with the higher instance of the target value level 306 to be bigger than the boundary size 216 for the geofence 202 surrounding the point of interest 206 frequented by the user with the lower instance of the target value level 306. By making the boundary size 216 bigger, the navigation system 100 can maximize the selection count 312 of the user selecting the notification 314.

It has been discovered that the navigation system 100 determining the boundary dimension 214 based on the target value level 306 improves the efficiency of delivering the notification 314 to the user. By tailoring the boundary dimension 214 according to the target value level 306, the navigation system 100 can optimally deliver the notification 314 relevant to the user. As a result, the navigation system 100 can improve the efficiency for improved operation of the first device 102, the navigation system 100, or a combination thereof.

For a different example, the dimension module 506 can determine the boundary dimension 214 based on the travel distance 222 traveled by the user to reach the point of interest 206. More specifically, some instances of the point of interest 206, such as a high-end restaurant, can attract the user from afar. In contrast, the point of interest 206 with the lower instance of the price level 310, such as coffee shop, can attract user locally, thus not attracting the users from afar.

The dimension module 506 can determine the boundary dimension 214 by having the boundary size 216 for the geofence 202 surrounding the high-end restaurant to be smaller than the boundary size 216 for the geofence 202 surrounding the coffee shop. More specifically, the user who is willing to traveling from afar may not be attracted by the notification 314 presented. Thus, having the geofence 202 that is bigger may not be the most efficient way to deliver the notification 314.

Similarly, the dimension module 506 can determine the boundary dimension 214 based on the price level 310 for the location category 212. More specifically, some instances of an item with the higher instance of the price level 310, such as an automobile, can attract the user from afar. In contrast, some instances of the item with the lower instance of the price level 310, such as coffee, can only attract local user. The dimension module 506 can determine the boundary dimension 214 by having the boundary size 216 for the geofence 202 surrounding the point of interest 206 selling the automobile to be smaller than the boundary size 216 for the geofence 202 surrounding the coffee shop For another example, the dimension module 506 can determine the boundary dimension 214 based on the notification type 318. As discussed above, the notification type 318 can represent a coupon. More specifically, the coupon can have an updated value based on the geofence factor 302. The dimension module 506 can update the boundary dimension 214 in relation to the change in the notification type 318. More specifically, the dimension module 506 can increase the boundary size 216 of the geofence 202 if the value of the coupon increases. In contrast, the dimension module 506 can decrease the boundary size 216 of the geofence 202 if the value of the coupon decreases. The dimension module 506 can communicate the boundary dimension 214 to a placement module 508.

The navigation system 100 can include the placement module 508, which can couple to the dimension module 506. The placement module 508 determines the placement location 210 of FIG. 2. For example, the placement module 508 can determine the placement location 210 of the geofence 202 based on the geofence factor 302, the notification type 318, or a combination thereof.

The placement module 508 can determine the placement location 210 in a number of ways. For example, the placement module 508 can determine the placement location 210 based on the geofence factor 302 representing the timeframe 308. More specifically, the timeframe 308 can represent the morning or the evening.

Continuing with the example, the point of interest 206 can represent a coffee shop along a major street. Based on the timeframe 308, the travel origin 220 to the point of interest 206 can differ. For example, a number of users coming from the travel origin 220 of north can be greater in the timeframe 308 of morning. In contrast, a number of users coming from the travel origin 220 can be greater in the timeframe 308 of evening. As a result, the placement module 508 can determine the placement location 210 of the geofence 202 on the north end of the point of interest 206 in the morning and on the south end of the point of interest 206 in the evening.

For a different example, the placement module 508 can determine the placement location 210 based on the selection count 312 meeting or exceeding the selection threshold 316. More specifically, if the selection count 312 is below the selection threshold 316, the placement module 508 can determine not to determine the placement location 210, thus, not placing the geofence 202 around or surrounding the point of interest 206. In contrast, if the selection count 312 meets or exceeds the selection threshold 316, the placement module 508 can determine the placement location 210 of the geofence 202.

For further example, the placement module 508 can determine the placement location 210 based on the target value level 306 of the user, the valuable target number 322 of FIG. 3, the target threshold 324 of FIG. 3, or a combination thereof. More specifically, the activity history 304 can indicate the valuable target number 322 of user with the target value level 306. The placement module 508 can determine the placement location 210 if the valuable target number 322 of the user with the highest instance of the target value level 306 meets or exceeds the target threshold 324.

For a different example, the placement module 508 can determine the placement location 210 of the geofence 202 surrounding or around the user location 204. More specifically, the placement module 508 can determine the placement location 210 of the geofence 202 where the user location 204 is detected, the future location where the user location 204 will likely to be detected, or a combination thereof.

For another example, the placement module 508 can determine the placement location 210 based on the notification type 318. As discussed above, the notification type 318 can represent a coupon for discount. Further, the notification type 318 can be updated by changing the value of discount of the coupon based on the geofence factor 302 including, for example, the point of interest 206, the timeframe 308, or a combination thereof.

The placement module 508 can determine the placement location 210 based on the notification type 318 to maximize the selection count 312 of the user selecting the notification 314. More specifically, the placement module 508 can determine the placement location 210 for the geofence 202 for the notification type 318 with $2 off coupon for the location category 212 representing a fast food chain for the timeframe 308 of morning. In contrast, the placement module 508 can determine the placement location 210 for the geofence 202 for the notification type 318 of $1 off coupon for the fast food chain for the timeframe 308 of 3 pm. The placement module 508 can communicate the placement location 210 to a priority module 510.

The navigation system 100 can include the priority module 510, which can couple to the placement module 508. The priority module 510 determines the boundary priority 320 of FIG. 3. For example, the priority module 510 can determine the boundary priority 320 based on the geofence factor 302.

The priority module 510 can determine the boundary priority 320 in a number of ways. For example, the priority module 510 can determine the boundary priority 320 based on the target value level 306. More specifically, a plurality of the geofence 202 can be placed at the point of interest 206, surrounding the point of interest 206, or a combination thereof. Moreover, one instance of the geofence 202 can be placed adjacent, within, or a combination thereof to another instance of the geofence 202.

The priority module 510 can determine the boundary priority 320 between one instance of the geofence 202 compared to another instance of the geofence 202. For example, the point of interest 206 can be located along a freeway. During the timeframe 308 of morning, the northbound direction of the freeway can have higher instance of the valuable target number 322 for the user with the highest instance of the target value level 306 than the southbound direction of the freeway. As a result, the priority module 510 can determine the higher instance of the boundary priority 320 for the geofence 202 to be placed on the northbound side of the freeway than the boundary priority 320 of the geofence 202 placed on the southbound side of the freeway.

For a different example, the priority module 510 can determine the boundary priority 320 based on the notification type 318. More specifically, the priority module 510 can determine a higher instance of the boundary priority 320 for the geofence 202 displaying the notification type 318 with greater value of discount than the geofence 202 displaying the notification type 318 with lesser value of discount. The priority module 510 can communicate the boundary priority 320 to a boundary module 512.

It has been discovered that the navigation system 100 determining the boundary priority 320 can improve the efficiency of delivering the notification 314 to the user. By determining the boundary priority 320 of the geofence 202, the navigation system 100 can allocate the resource optimally for delivering the notification 314 to the user. As a result, the navigation system 100 can improve the efficiency of the delivering the notification 314 for improved operation of the first device 102, the navigation system 100, or a combination thereof.

The navigation system 100 can include the boundary module 512, which can couple to the priority module 510. The boundary module 512 generates the geofence 202. For example, the boundary module 512 can generate the geofence 202 based on the geofence type 224 of FIG. 2 including the dynamic geofence 226 of FIG. 2, the static geofence 228 of FIG. 2, or a combination thereof.

The boundary module 512 can generate the geofence 202 in a number of ways. For example, the boundary module 512 can generate the geofence 202 based on the boundary dimension 214, the geofence factor 302, or a combination thereof. More specifically, the boundary module 512 can generate the geofence 202 representing the dynamic geofence 226 for adjusting the boundary dimension 214 including the boundary size 216, the boundary shape 218, or a combination thereof based on the timeframe 308. For a specific example, the boundary module 512 can generate the dynamic geofence 226 having the boundary size 216 bigger for the morning than the evening.

For a different example, the boundary module 512 can generate the dynamic geofence 226 based on the change in the notification type 318. As discussed above, the value of the notification type 318 representing a coupon can change. The boundary module 512 can generate the dynamic geofence 226 based on changing the boundary dimension 214 based on the change in the value of the notification type 318. For example, the boundary module 512 can generate the dynamic geofence 226 including the boundary dimension 214 that can change with the notification type 318 proportionally or inversely proportional to the increase or decrease in the value.

For another example, the boundary module 512 can generate the dynamic geofence 226, the static geofence 228, or a combination thereof based on the placement location 210. For a specific example, the placement location 210 can be determined based on the highest instance of the target value level 306 at the point of interest 206. Since the point of interest 206 is consistently visited by the user with the highest instance of the target value level 306, the boundary module 512 can generate the static geofence 228 for the point of interest 206 since no change may be needed for the geofence. In contrast, if the point of interest 206 attracts the users with various instances of the target value level 306, the boundary module 512 can generate the dynamic geofence 226 to maximize the selection of the notification 314 by the user.

For a different example, the boundary module 512 can generate the geofence 202 based on the boundary priority 320. More specifically, the boundary module 512 can generate the dynamic geofence 226 having the boundary dimension 214 change in proportion or inversely proportion to the change in the boundary priority 320 of the geofence 202. For example, if the boundary priority 320 increases, the boundary module 512 can update by increasing the boundary size 216 of the dynamic geofence 226. The boundary module 512 can communicate the geofence 202 to a presentation module 514.

The navigation system 100 can include the presentation module 514, which can couple to the boundary module 512. The presentation module 514 presents the geofence 202. For example, the presentation module 514 can display the geofence 202 on the first device 102.

The presentation module 514 can present the geofence 202 in a number of ways. For example, the presentation module 514 can present the geofence 202 along with the geofence factor 302. More specifically, the presentation module 514 can display the digital depiction of the user location 204, the point of interest 206, the travel origin 220, the geographic region 208, or a combination thereof to represent the physical world.

For further example, the presentation module 514 can depict the user traversing through the geographic region 208 to enter or exit the geofence 202. As a result, the presentation module 514 can display the notification 314 triggered by the action performed by the user of the navigation system 100 traversing in the geographic region 208

The physical transformation from moving from the travel origin 220 to the point of interest 206 results in the movement in the physical world, such as people using the first device 102, the vehicle, or a combination thereof, based on the operation of the navigation system 100.

As the movement in the physical world occurs, the movement itself creates additional information that is converted back into determining the boundary dimension 214, the placement location 210, the boundary priority 320 of the geofence 202, or a combination thereof for the continued operation of the navigation system 100 and to continue the movement in the physical world.

The first software 426 of FIG. 4 of the first device 102 of FIG. 4 can include the modules for the navigation system 100. For example, the first software 426 can include the factor module 502, the notification module 504, the dimension module 506, the placement module 508, the priority module 510, the boundary module 512, and the presentation module 514.

The first control unit 412 of FIG. 4 can execute the first software 426 for the factor module 502 to manage the geofence factor 302. The first control unit 412 can execute the first software 426 for the notification module 504 to generate the notification 314. The first control unit 412 can execute the first software 426 for the dimension module 506 to determine the boundary dimension 214.

The first control unit 412 can execute the first software 426 for the placement module 508 to determine the placement location 210. The first control unit 412 can execute the first software 426 for the priority module 510 to determine the boundary priority 320. The first control unit 412 can execute the first software 426 for the boundary module 512 to generate the geofence 202. The first control unit 412 can execute the first software 426 for the presentation module 514 to present the geofence 202.

The second software 442 of FIG. 4 of the second device 106 of FIG. 4 can include the modules for the navigation system 100. For example, the second software 442 can include the factor module 502, the notification module 504, the dimension module 506, the placement module 508, the priority module 510, the boundary module 512, and the presentation module 514.

The second control unit 434 of FIG. 4 can execute the second software 442 for the factor module 502 to manage the geofence factor 302. The second control unit 434 can execute the second software 442 for the notification module 504 to generate the notification 314. The second control unit 434 can execute the second software 442 for the dimension module 506 to determine the boundary dimension 214.

The second control unit 434 can execute the second software 442 for the placement module 508 to determine the placement location 210. The second control unit 434 can execute the second software 442 for the priority module 510 to determine the boundary priority 320. The second control unit 434 can execute the second software 442 for the boundary module 512 to generate the geofence 202. The second control unit 434 can execute the second software 442 for the presentation module 514 to present the geofence 202

The modules of the navigation system 100 can be partitioned between the first software 426 and the second software 442. The second software 442 can include the notification module 504, the dimension module 506, the placement module 508, the priority module 510, and the boundary module 512. The second control unit 434 can execute modules partitioned on the second software 442 as previously described.

The first software 426 can include the factor module 502 and the presentation module 514. Based on the size of the first storage unit 414, the first software 426 can include additional modules of the navigation system 100. The first control unit 412 can execute the modules partitioned on the first software 426 as previously described.

The first control unit 412 can operate the first communication interface 428 of FIG. 4 to communicate the geofence factor 302, the notification 314, the geofence 202, or a combination thereof to or from the second device 106. The first control unit 412 can operate the first software 426 to operate the location unit 420 of FIG. 4. The second control unit 434 can operate the second communication interface 450 of FIG. 4 to communicate the geofence factor 302, the notification 314, the geofence 202, or a combination thereof to or from the first device 102 through the communication path 104 of FIG. 4. The presentation module 514 can represent the first user interface 418 of FIG. 4, the second user interface 438 of FIG. 4, or a combination thereof.

The navigation system 100 describes the module functions or order as an example. The modules can be partitioned differently. For example, the dimension module 506 and the placement module 508 can be combined. Each of the modules can operate individually and independently of the other modules. Furthermore, data generated in one module can be used by another module without being directly coupled to each other. For example, the placement module 508 can receive the geofence factor 302 from the factor module 502. Further, "communicating" can represent sending, receiving, or a combination thereof the data generated to or from one to another.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules.

The modules described in this application can be implemented as instructions stored on a non-transitory computer readable medium to be executed by the first control unit 412, the second control unit 434, or a combination thereof. The non-transitory computer medium can include the first storage unit 414 of FIG. 4, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
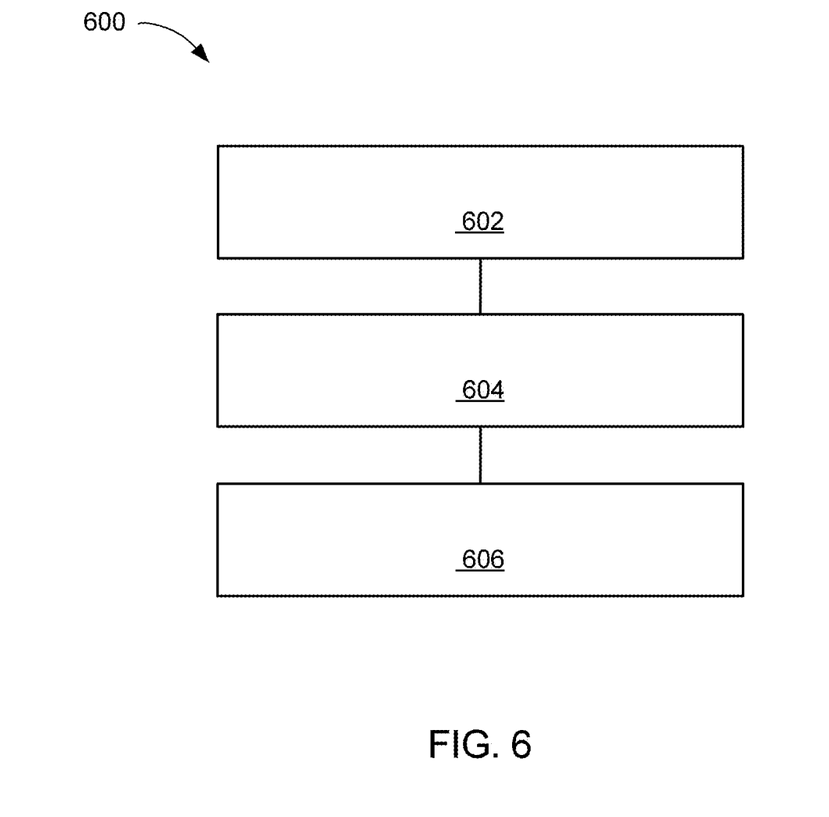
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: determining a target value level based on an activity history for responding to a notification in a block 602; determining a boundary dimension with a control unit based on the target value level in a block 604; and generating a geofence including the boundary dimension for adjusting the boundary size for displaying on a device in a block 606.

It has been discovered that the navigation system 100 determining the target value level 306 of FIG. 3 based on the activity history 304 FIG. 3 for the user responding to the notification 314 of FIG. 3 improves the efficiency of delivering the notification 314 to the user. By determining the target value level 306, the navigation system 100 can determine the boundary dimension 214 of FIG. 2 optimal for the geographic region 208 of FIG. 2. As a result, the navigation system 100 can generate the geofence 202 of FIG. 2 including the boundary dimension 214 with the boundary size 214 of FIG. 2 optimal to improve the efficiency for delivering and displaying the geofence 202, the notification 314, or a combination thereof on the first device 102 of FIG. 1.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    determining a target value level based on an activity history for responding to a notification, wherein the target value level represents a user's importance to an advertiser of the notification;
    determining a boundary dimension for a geofence with a control unit based on the target value level; and
    generating the geofence including the boundary dimension for adjusting the boundary size for displaying on a device.

2. The method as claimed in claim 1 wherein generating the geofence includes generating a dynamic geofence including the boundary dimension adjustable based on a timeframe.

3. The method as claimed in claim 1 wherein generating the geofence includes generating a dynamic geofence including the boundary dimension adjustable based on a notification type.

4. The method as claimed in claim 1 further comprising determining a boundary priority based on the target value level for prioritizing one instance of the geofence over another instance of the geofence.

5. The method as claimed in claim 1 further comprising determining a placement location based on a time frame for increasing a selection count of the notification.

6. The method as claimed in claim 1 wherein determining the target value level includes determining the target value level based on a selection count meeting or exceeding a selection threshold.

7. The method as claimed in claim 1 wherein determining the boundary dimension includes determining a boundary shape based on a timeframe for adjusting the geofence.

8. The method as claimed in claim 1 wherein determining the boundary dimension includes determining the boundary dimension based on a travel origin for adjusting the geofence.

9. The method as claimed in claim 1 wherein determining the boundary dimension includes determining the boundary dimension based on a region density for adjusting the geofence.

10. The method as claimed in claim 1 wherein determining the boundary dimension includes determining the boundary dimension based on a travel distance traveled for adjusting the geofence.

11. A navigation system comprising:
   a control unit for:
      determining a target value level based on an activity history for responding to a notification, wherein the target value level represents a user's importance to an advertiser of the notification;
      determining a boundary dimension for a geofence based on the target value level,
      generating the geofence including the boundary dimension for adjusting the boundary size, and
   a communication interface, coupled to the control unit, for communicating the geofence for displaying on a device.

12. The system as claimed in claim 11 wherein the control unit is for generating a dynamic geofence including the boundary dimension adjustable based on a timeframe.

13. The system as claimed in claim 11 wherein the control unit is for generating a dynamic geofence including the boundary dimension adjustable based on a notification type.

14. The system as claimed in claim 11 wherein the control unit is for determining a boundary priority based on the target value level for prioritizing one instance of the geofence over another instance of the geofence.

15. The system as claimed in claim 11 wherein the control unit is for determining a placement location based on a time frame for increasing a selection count of the notification.

16. A non-transitory computer readable medium including instructions for execution, the instructions comprising:
   determining a target value level based on an activity history for responding to a notification, wherein the target value level represents a user's importance to an advertiser of the notification;
   determining a boundary dimension for a geofence based on the target value level; and
   generating the geofence including the boundary dimension for adjusting the boundary size for displaying on a device.

17. The non-transitory computer readable medium as claimed in claim 16 wherein generating the geofence includes generating a dynamic geofence including the boundary dimension adjustable based on a timeframe.

18. The non-transitory computer readable medium as claimed in claim 16 wherein generating the geofence includes generating a dynamic geofence including the boundary dimension adjustable based on a notification type.

19. The non-transitory computer readable medium as claimed in claim 16 further comprising determining a boundary priority based on the target value level for prioritizing one instance of the geofence over another instance of the geofence.

20. The non-transitory computer readable medium as claimed in claim 16 further comprising determining a placement location based on a time frame for increasing a selection count of the notification.

* * * * *